(12) United States Patent
Markfield

(10) Patent No.: US 8,042,494 B2
(45) Date of Patent: Oct. 25, 2011

(54) PET PROTECTIVE COLLAR

(76) Inventor: Linda Markfield, Los Angeles, CA (US)

( * ) Notice: Subject to any disclaimer, the term of this patent is extended or adjusted under 35 U.S.C. 154(b) by 0 days.

(21) Appl. No.: 11/847,156

(22) Filed: Aug. 29, 2007

(65) Prior Publication Data

US 2009/0056642 A1 Mar. 5, 2009

(51) Int. Cl.
*A01K 13/00* (2006.01)
*A01K 29/00* (2006.01)
(52) U.S. Cl. ............ 119/855; 119/821; 119/815
(58) Field of Classification Search .......... 119/856, 119/821, 855, 815, 837, 863, 865
See application file for complete search history.

(56) References Cited

U.S. PATENT DOCUMENTS

| | | | |
|---|---|---|---|
| 180,518 A | 8/1876 | Armentrout | |
| 205,515 A | 7/1878 | Von Culin | |
| 1,960,312 A | 5/1934 | Landorf | |
| 2,043,153 A | 6/1936 | Cox | |
| 2,188,787 A | 1/1940 | Keener | |
| 2,233,832 A | 3/1941 | Byrd | |
| 2,241,855 A | 5/1941 | Heisterberg | |
| 2,496,748 A | 2/1950 | Pond | |
| 2,799,245 A | 7/1957 | Ruggiero et al. | |
| 2,810,368 A | 10/1957 | McCombe | |
| 2,891,508 A | 6/1959 | Bower | |
| 2,956,542 A | 10/1960 | Mueller | |
| 2,989,030 A | 6/1961 | Draheim | |
| 2,998,008 A | 8/1961 | Klesa | |
| 3,013,530 A | 12/1961 | Zeman | |
| 3,036,554 A | 5/1962 | Johnson | |
| 3,072,098 A | 1/1963 | Boemle | |
| 3,153,399 A | 10/1964 | Koon | |
| 3,696,810 A * | 10/1972 | Gaylord, Jr. | 602/18 |
| 3,942,306 A | 3/1976 | Kulka | |
| 3,983,604 A | 10/1976 | Phillips | |
| 4,036,179 A | 7/1977 | Turner et al. | |
| 4,200,057 A | 4/1980 | Agar | |
| 4,286,547 A | 9/1981 | Nuwbauer et al. | |
| 4,328,605 A | 5/1982 | Hutchison et al. | |
| 4,476,814 A | 10/1984 | Miller | |
| 4,622,957 A | 11/1986 | Curlee | |
| 4,667,098 A | 5/1987 | Everett | |
| 4,719,876 A * | 1/1988 | Wilken | 119/815 |
| 5,012,764 A * | 5/1991 | Fick et al. | 119/821 |
| 5,133,295 A * | 7/1992 | Lippincott | 119/821 |
| 5,197,414 A | 3/1993 | Kanakura | |
| 5,307,764 A | 5/1994 | Moy | |

(Continued)

FOREIGN PATENT DOCUMENTS

DE 4100851 A1 * 7/1991

(Continued)

*Primary Examiner* — Son T Nguyen
(74) *Attorney, Agent, or Firm* — Michael D. Eisenberg

(57) ABSTRACT

A custom fittable collar for an animal, useful to prevent the animal from contacting injured areas on the body, thus promoting healing of wounds. The collar comprises opposing sheets of flexible material with a resilient material held between them. The resulting collar is rigid enough to resist deformation thus preventing licking or biting of a wound by the animal, but soft enough that the collar is both comfortable to wear, and less likely to catch on other objects, thus improving the safety and wearability of the collar. The collar further comprises a closure assembly adapted for easy placement or removal of the collar. The collar further comprises stitching that creates fold lines to allow the collar to be conveniently folded.

13 Claims, 7 Drawing Sheets

U.S. PATENT DOCUMENTS

| | | | |
|---|---|---|---|
| 5,697,328 A * | 12/1997 | Hunter | 119/714 |
| 5,915,337 A * | 6/1999 | Klinkhart et al. | 119/815 |
| 6,044,802 A | 4/2000 | Schmid et al. | |
| 6,244,222 B1 * | 6/2001 | Bowen | 119/856 |
| 6,532,904 B1 * | 3/2003 | Bowen | 119/865 |
| 6,659,046 B2 * | 12/2003 | Schmid et al. | 119/815 |
| 2007/0073203 A1 * | 3/2007 | Moenning et al. | 602/18 |
| 2007/0181080 A1 * | 8/2007 | Gibson | 119/815 |
| 2007/0199521 A1 * | 8/2007 | Winestock | 119/855 |
| 2009/0000569 A1 | 1/2009 | Behravesh | |

FOREIGN PATENT DOCUMENTS

| | | | |
|---|---|---|---|
| FR | 2628290 A1 * | 9/1989 | |
| JP | 10028489 A * | 2/1998 | |
| JP | 2007089552 A * | 4/2007 | |
| WO | WO 8400666 A1 * | 3/1984 | |

* cited by examiner

PET PROTECTIVE COLLAR

FIELD

The present invention relates to protective collars, also known as veterinary restraints, for small animals and commonly called "Elizabethan collars" or "e-collars". The collar is useful for preventing the animal from licking or biting wounds, or disrupting surgical stitches. The collar further prevents disruption of medications applied topically at the site of an injury, or surgical wound.

BACKGROUND

When wounded or when a diseased site is present, many animals, for example cats and dogs will instinctively lick or bite at the site of the injury or disease. Repeated licking typically results in slower healing and increased risk of infection. Where animals have undergone a surgical procedure, licking further risks disruption of sutures placed to keep the surgical wound closed while the healing process proceeds. Disruption of a surgical wound is highly undesirable as it subjects the animal to the risk of serious or even fatal internal infections. In any case where a medication is applied, the animal tends to lick it.

As a result, a variety of approaches have been developed to prevent animals from licking or otherwise disturbing wounds or a diseased or injured area while they are healing. For example, one common approach is to use a protective collar known as an "Elizabethan collar" or "E-collar" as they are sometimes called. These collars usually are formed from flexible but relatively rigid materials such as sheets of plastic or cardboard, and are provided in a range of sizes in order to accommodate animals of different size. The E-collar is wrapped around the animal's neck and then secured in place as a means by which to prevent the animal from contacting or otherwise disturbing a wound or site of application of a topical medicament.

One example is provided by U.S. Pat. No. 4,200,057 (Agar), which discloses a method of using a cone-shaped collar made of a semi-rigid material that when secured forms a cone around the animal's neck and which prevents the animal from contacting a region on the animal to which a substance has been applied topically. However, while commonly used, traditional E-collars suffer from a number of limitations that detract from their usefulness.

For example, as discussed above, these collars are usually fashioned from relatively rigid materials. Consequently they are not adapted to folding and take up significant space when on a store shelf, or when stored by an animal owner after purchase and between uses. In addition, the rigid material tends to be uncomfortable for the animal to wear and it can break if bent too far. The rigid materials typically used in E-collars also make it difficult for the animal to eat or drink or get through tight spaces, and the pet is jarred if it bumps into something straight-on. The rigid E-collars can scratch furniture, knock things over and hurt a person. Also, the noise of striking something or even brushing against something can cause stress for the pet.

It is well known in the art that animals dislike the application of the E-collar and will attempt to remove it. This results in increased stress to the animal, and if removed, obviates the utility of the collar to prevent contact of an injured area by the animal, prolonging healing time and increasing the risk of serious infection.

A variety of protective collars have been described, some based on the traditional E-collar design, and others using other designs. For example, U.S. Pat. No. 5,012,764 (Fick & Fair) discloses a cone-shaped E-collar with a custom fittable closure. The device improves upon the traditional collar in that it provides a "one-size fits all" capability. However, the Fick device still suffers from design limitations in that it is a rigid collar that animals dislike.

U.S. Pat. No. 5,469,814 (Moy & Moy) discloses a protective collar that avoids the cone-shape of the traditional E-collar. In the Moy device, the collar comprises a sheet of flexible material sized to cover the entire neck from the back of the mandible to the scapula. Thus, the movement of the neck is restricted such that the animal is prevented from licking or biting at wounds. However, the device is not useful in protecting irritation of injuries to the head as the close fitting design does not prevent pawing of an injury of the head or face.

Similarly, U.S. Pat. No. 4,476,814 (Miller) discloses a donut shaped collar that is wide enough to prevent an animal from turning its head sufficiently in order to lick or chew at an affected area.

Likewise, U.S. Pat. No. 6,244,222 (Bowen) discloses a foam sleeve that like that disclosed in U.S. Pat. No. 5,469,814 covers a region of the animal's neck thereby preventing the animal from bending the neck in order to contact an affected area.

As discussed, the aforementioned E-collars are generally formed from rigid materials, such as plastic, that are uncomfortable and thus not well tolerated by animals. To overcome this problem, some collars have been disclosed that are formed from softer more compliant materials. For example, U.S. Pat. No. 5,133,295 (issued to Lippincott) discloses a collar that comprises two side-by-side rings of soft material, with non-resilient medical padding sewn together along their inner margins. The rings are gathered to form radial pleats that interfere with the ability of the animal to chew or lick affected body parts. However, as the collar could conceivably be bent backwards from the head, it would be possible for an animal to paw at injuries in the head area, again limiting the overall usefulness of this type of collar. Also, a soft e-collar can be easily chewed by the pet due to the inside material being loose.

SUMMARY

Accordingly it is an object of the present invention to provide a protective collar suitable for use as a veterinary restraint, and which overcomes problems inherent in prior art collars.

It is another object to provide a protective collar comprising resilient yet softer materials than is found in prior art E-collar type devices. To this end, the protective collar of the invention provides first and second sheets of flexible material between which is sandwiched a resilient padding layer. The padding layer provide sufficient structure to maintain the collar in the desired shape when fitted on an animal, but is soft enough such that the collar is more comfortable than prior art collars.

It is thus an object to provide a protective collar that takes advantage of the cone-shape of traditional E-collars, yet is made of more compliant materials such that an animal fitted with the collar will better tolerate it. The collar may be produced in various sizes to accommodate animals of different size, or may provide multiple closures to permit fitting of a single collar onto animals of differing size. Also, using the multiple closure features, the shape of the cone can be adjusted, for example, to be narrower at the outside, or wider at the outside. The user can conform the shape as desired to conform to the pet's head and neck shape and size.

The resilient padding layer provides sufficient rigidity that the collar will hold its shape when in use. In one embodiment the padding layer is comprised of foam material. To maintain the structure of the collar, the padding layer is secured to the first and second sheets of flexible material.

In one embodiment the padding layer is laminated into at least one of the first and second sheets of flexible material. Securing the padding to the flexible sheet provides the further advantage of preventing the animal from tearing or otherwise separating the padding layer from the flexible sheets.

The use of stitching may be further used to secure the first and second sheets and padding layer. In one embodiment, radially oriented stitching advantageously provides folding lines to aid in folding the collar for storage when it is not in use.

Fitting the collar on an animal is simple. Fitting involves placing the inner edge of the collar around the animal's neck and then securing the ends of the collar, thus forming a truncated cone, with the large opening facing forward, and the smaller opening fitted around the animal's neck.

The securing means may be any suitable means that will maintain the ends of the collar in contact. In one embodiment the means of securing the collar are hook and loop matable fastener strips such as Velcro® strips placed substantially at each end of the collar. Other embodiments could make use of hook and loop arrangements, snaps or other like securing means.

The invention further provides a method of protecting an area on an animal's body from undesired contact such as chewing or biting by fitting a collar as described herein. The area to be protected could be a site of a surgical injury, for example surgical stitches, a non-surgical injury, or an area to which a topical medicament has been applied.

DETAILED DESCRIPTION

Figure 1:
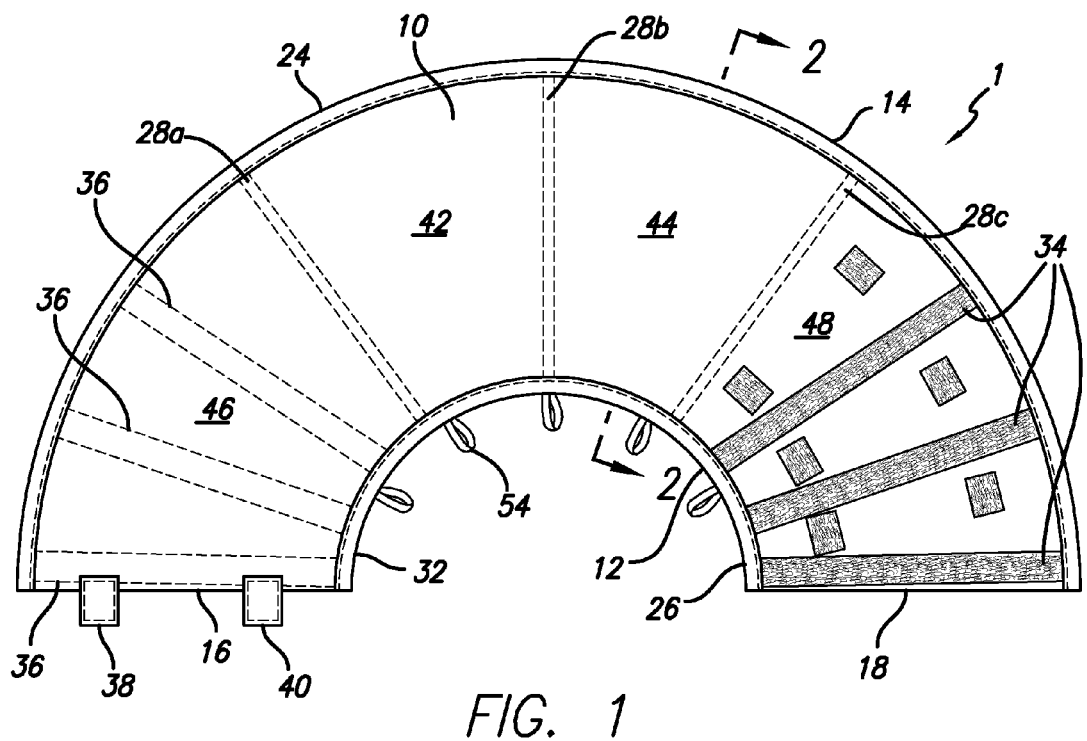
FIG. 1 is a top view of an embodiment of the protective collar in the unfolded configuration.
Figure 2:
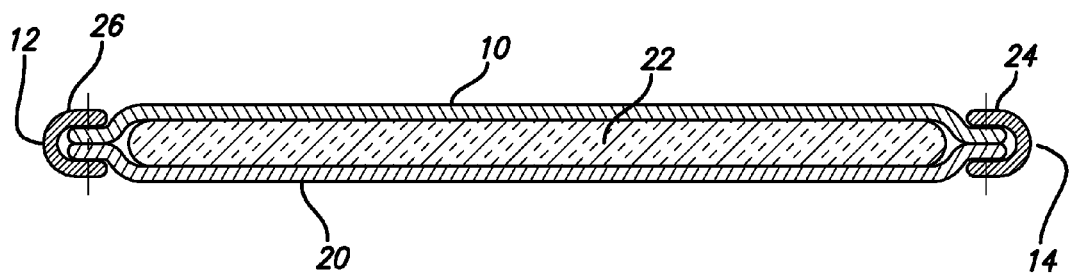
FIG. 2 is a section view of the protective collar of FIG. 1 through 2-2 of FIG. 1, depicting the arrangement of first and second exterior sheets and a padding layer and the stitching along each of the arcuate edges.
Figure 3:
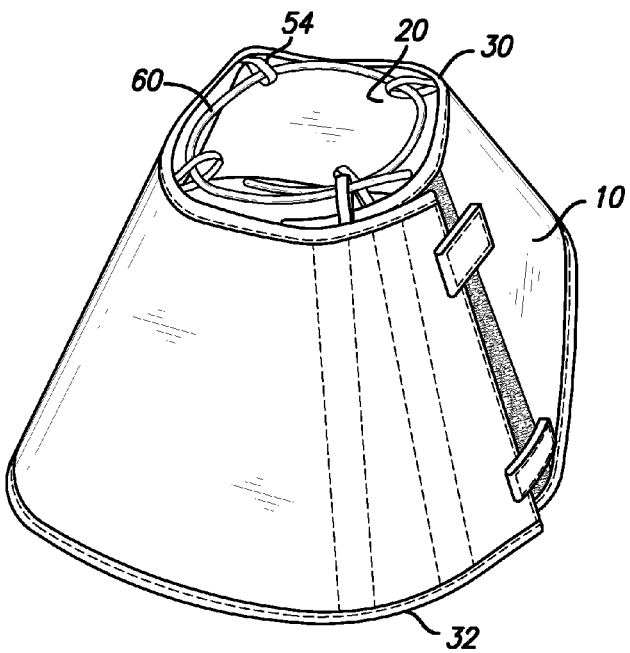
FIG. 3 is a perspective view of the protective collar of FIG. 1, as it would appear when fitted on an animal.

Referring first to FIGS. 1, 2 and 3, the present invention provides a protective collar 1 effective as a veterinary restraint when fitted on an animal. In this embodiment of the invention the protective collar 1 comprises a first exterior sheet 10 comprising a flexible material having inner and outer arcuate edges 12 and 14 respectively, the edges being generally concentric around a common center and extending between a first end 16 and a second end 18. A second exterior sheet 20 (underneath sheet 10 in FIG. 1) also comprises a flexible material. The second exterior sheet 20 is substantially the same size and shape to enable creating the two sides of the collar with a space for a resilient padding layer 22 as shown in FIG. 2.

The resilient padding layer 22, also of a generally similar shape to the first and second exterior sheets 10 and 20, and is sized to be located between the first and second exterior sheets 10 and 20 as shown in FIG. 2. When assembled, the first and second exterior sheets 10 and 20 and the resilient padding layer 30 form a substantially at least semi-circular shape, as has been shown in FIG. 1. Actually, in order to allow a lot of size adjustability, it is somewhat greater than semi-circular.

The first and second exterior sheets 10 and 20 can be fashioned from a variety of materials including cloth, rubberized cloth, soft plastic and the like. Apart from the physical quality to provide a soft, flexible surface of the finished assembly, the first and second exterior sheets and the resilient padding between then, when formed into the in-use cone shape needs only to be sufficiently rigid and resilient to be self-supporting. The present invention uses materials that are soft and flexible and specifically avoids the use of rigid plastic sheet materials as is commonly found in traditional E-collars. In one particular, it may be desirable to select a soft-surfaced comfortable material for the inside of the collar adjacent to the animals head and neck, and a more rugged material for the outside pf the collar. Also, the outside of the collar may be provided in a decorative motif, and may be made of material that is easily cleaned and/or that is resistant to staining.

The padding layer 22 may also be fashioned from a variety of materials. The material used in the padding layer 22 should be flexible enough to provide a collar that is softer and therefore more comfortable than traditional e-collar, yet is rigid enough to maintain the desired cone-like shape of the collar when worn by an animal and sufficiently resilient to return to its cone shape when bent. It is preferred that the first and second exterior sheets 10 and 20 be quite flexible with little resilience and resistance to bending, while the padding layer 22 be more resilient such that when they are formed into a unit and applied to an animal in a cone shape it will be sufficiently rigid to maintain its cone configuration yet will easily give when hit or pushed or bent and resilient enough to recover its cone shape. Foam plastic is a good material for use as the padding layer, and a wide range of resiliency, and thickness is available.

In the embodiment of FIGS. 1, 2 and 3 the padding layer 22 comprises a layer of foam sandwiched between the first and second exterior sheets 10 and 20, as shown in FIG. 2. Other materials such as non-woven sheets or like materials may be used to provide a soft sufficiently resilient and rigid padding layer. The first exterior sheet 10 and the second exterior sheet 20 are joined along their peripheries 12 and 14 by sewing.

In the embodiment shown in FIGS. 1, 2 and 3, using separate exterior sheets 10 and 20, they are sewn together along the inner arcuate edge 12 and the outer arcuate edge 14 using conventional hem sewing techniques, using outer hem strips 24 and 26 as shown in FIG. 2, with the padding layer 30 inside. The padding layer 22 may be sewn-in along the inner arcuate edge or the outer arcuate edge, or just retained in the space, the latter being shown in FIG. 2. The outer hem strip 24 (and also hem strip 26) can be made with a reflective surface or a glow-in-the-dark surface for safety and otherwise to easily spot the pet. The reflective surface or glow-in-the-dark surface serves as a means for identifying the animal upon which the collar is fitted.

Stitching can be used to further strengthen the collar while still allowing it to easily bend on contact and also to provide folding points. Radially extending stitching 28a, 28b and 28c comprising two parallel rows, provides some additional rigidity radially and also provides convenient folding points upon which the collar can be folded for storage or packaging, and further strengthen the integrity of the collar when in use. The preferred stitching is zigzag type or parallel rows of straight stitching that is of a selected width dimension such as about ⅛ inch to about ¼ inch and they extend substantially fully across the width from the arcuate edge 14 to the arcuate edge 12. Examples of collars folded for storage or packaging are shown in FIGS. 6-9d and are described below. It can be appreciated that the radial stitching lines are placed so that the collar will fold into at least approximately equal segments such that stitch 28a is about at the center of the collar and stitches 28b and 28c are about halfway to the beginning of the closure elements. That will allow it to be optimally folded for packaging or storage.

Figure 10:
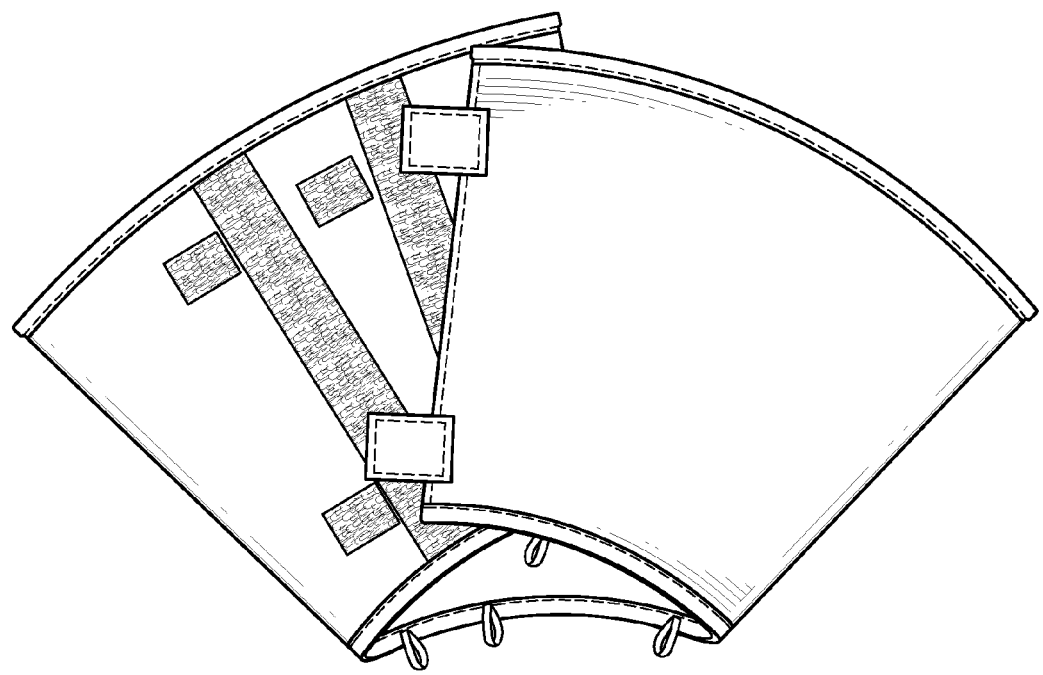
FIG. 10 shows the protective collar such as in FIG. 1 with its ends attached by use of hook and loop fasteners being mated in a skewed orientation to provide a selected fit.
Figure 11:
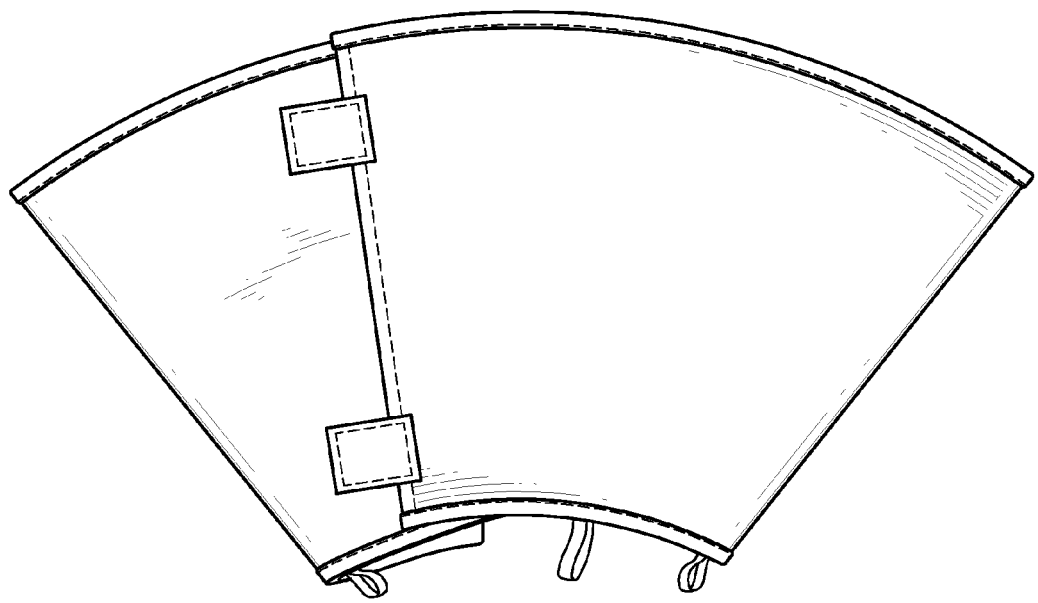
FIG. 11 shows the protective collar such as in FIG. 1 with its end attached in which the mating strips of hook and loop fasteners are aligned.

The invention further comprises a means of closure, effective to secure the ends of the protective collar, such that when the ends of the protective collar are secured, the collar forms a truncated cone with an inner opening 30 and an outer opening 32 as shown in FIG. 3. Various means of closure are suitable for use in the invention. In one embodiment hook and loop fastener strips such as Velcro products conveniently secure the ends of the collar to form the desired cone shape as shown in FIG. 3. In the embodiment shown in FIGS. 1, 2 and 3, a plurality of first hook and loop strips 34 are on the exterior sheet 10 (facing up in FIG. 1), in the example, three strips 34 and three sets of tabs 38 and mating plurality of three second hook and loop strips 36 are on the exterior sheet 20 (facing down in FIG. 1). Also, downward facing tabs 40 are sewn onto the end 16 being fastenable to any pair of the tabs 38, or any of the strips 34. As shown in FIG. 1 each end of the protective collar has three strips of fastener material 34 and 36 respectively. This allows the device to be sized appropriately to the animal by allowing a variety of engagement positions for greater or lesser opening neck fitting. Also, with the use of the tabs 40, in addition to providing options for sizing, the edge 16 can be kept from protruding. As few as one strip on one side and two strips on the other side will allow for minimal size adjustability. Using the multiple closure position features, such as the plurality of hook and loop strips a fitted closure can be selected for mating alignment and matching of the outer and inner edges such as shown in FIG. 11. This can be referred to as normal or edge aligned fitting. Also, the plurality of strips and tabs allow for non-edge matched closure, such that for example, the strips may be crossed with respect to each other to be not evenly aligned, so that the shape of the cone can be adjusted, for example, to be narrower at the outside, or wider at the outside or similarly at the inside, such as shown in FIG. 10. This can be referred to as distortion fitting or personalized fitting. The user can conform the shape as desired to conform to the pet's head and neck shape and size. In yet another embodiment snaps are used to secure the ends of the collar.

To maintain the integrity of the collar, the invention provides for a means of securing the first and second exterior sheets to the resilient padding layer. In one embodiment the means of securing the first and second sheets and padding layers comprises laminating or otherwise adhering the padding layer onto at least one of the exterior sheets of flexible material. In another embodiment, the padding layer is laminated or adhered onto both the first and second exterior sheets. Securing the padding layer to the sheets further prevents the animal from separating the layers of the collar and either reducing the effectiveness of the collar or destroying it altogether. In a preferred embodiment the padding layer is laminated or adhered only to the exterior sheet that will be on the inside of the cone, when formed around the animal's head.

Figure 4:
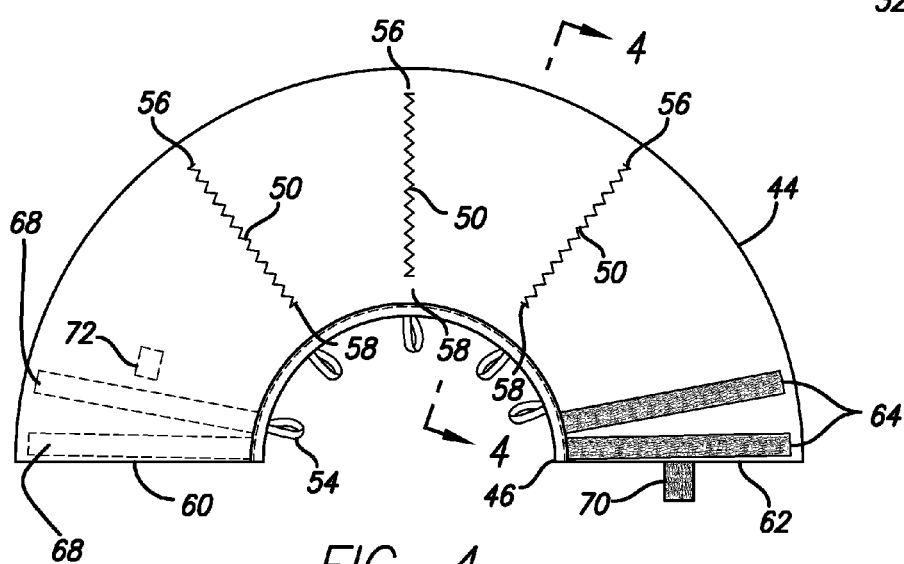
FIG. 4 is a top view of another embodiment of the protective collar in the unfolded configuration.
Figure 5:
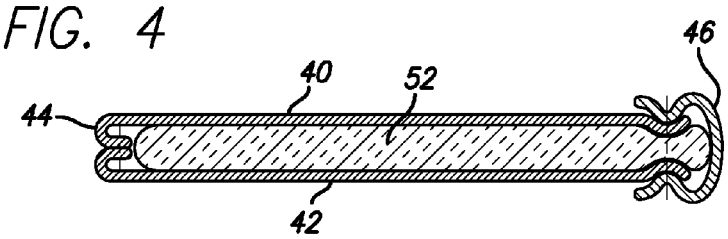
FIG. 5 is a section view of the protective collar of FIG. 2 through 4-4 of FIG. 3, depicting the arrangement of first and second exterior sheets and a padding layer and the stitching along each of the arcuate edges.

Another construction of the protective collar is shown in FIGS. 4 and 5. It is similar generally to the form in FIGS. 1, 2, and 3, but is suitable for smaller sizes, and softer material. In this form a first exterior sheet 40 and a second exterior sheet 42 are sewn together at the outer arcuate edge 44 with a blind hem stitch while the inner arcuate edge 46 has a regular hem stitch with a hem strip 48. Radial stitching 50 does not extend to the outer arcuate edge 44 or to the inner arcuate edge 46 but rather stops short of them leaving a space 56 adjacent the outer arcuate edge 44. There can also be a space 58 adjacent the inner arcuate edge 46. Ends 60 and 62 have near them fasteners such as strips of mating hook and loop fasteners 64 and 68. Also a tab 70 can fasten either to one of the strips 68 or to a patch 72. This construction is preferred for smaller sized protective collars in which a very light weight combination of materials is used such as for cats or kittens For example, the exterior sheets may be sheets of thin or cloth reinforced plastic sheet and the spaces 56 and 58 allow for easy bending. An inner padding 52 can be foam or other material as described above; and it may be adhered to the first exterior sheet or the second exterior sheet or both; preferable at least to the exterior sheet that will form the inside of the cone proximate the animal that is wearing it. This construction is preferred for smaller pets such as kittens. It is more easily flexed so as to make eating easier for the pet.

Conveniently, a number of neck closure means may be provided in order to provide the ability to fashion a protective collar capable of fitting different size animals. As shown in FIGS. 1, 3 and 4, a series of loops 54 are sewn into the hem. These can be made of elastic material so as to stretch to accept the pet's normal collar. Alternatively, a string 62 or other elongated member can be applied through the loops and pulled comfortably around the animal's neck to keep the unit in place. In another embodiment, a drawstring sewn into the inner edge might also be useful to further secure the collar on the animal.

When placed on an animal, the inner opening 30 is adapted to fit securely around the neck of the animal, and the outer opening 32 is of sufficient size to prevent the animal fitted with the protective collar from contacting an area of the body to be protected. If desired, the inner arcuate edge of the collar may be lined with a softer material to increase the comfort of the collar.

Figure 12:
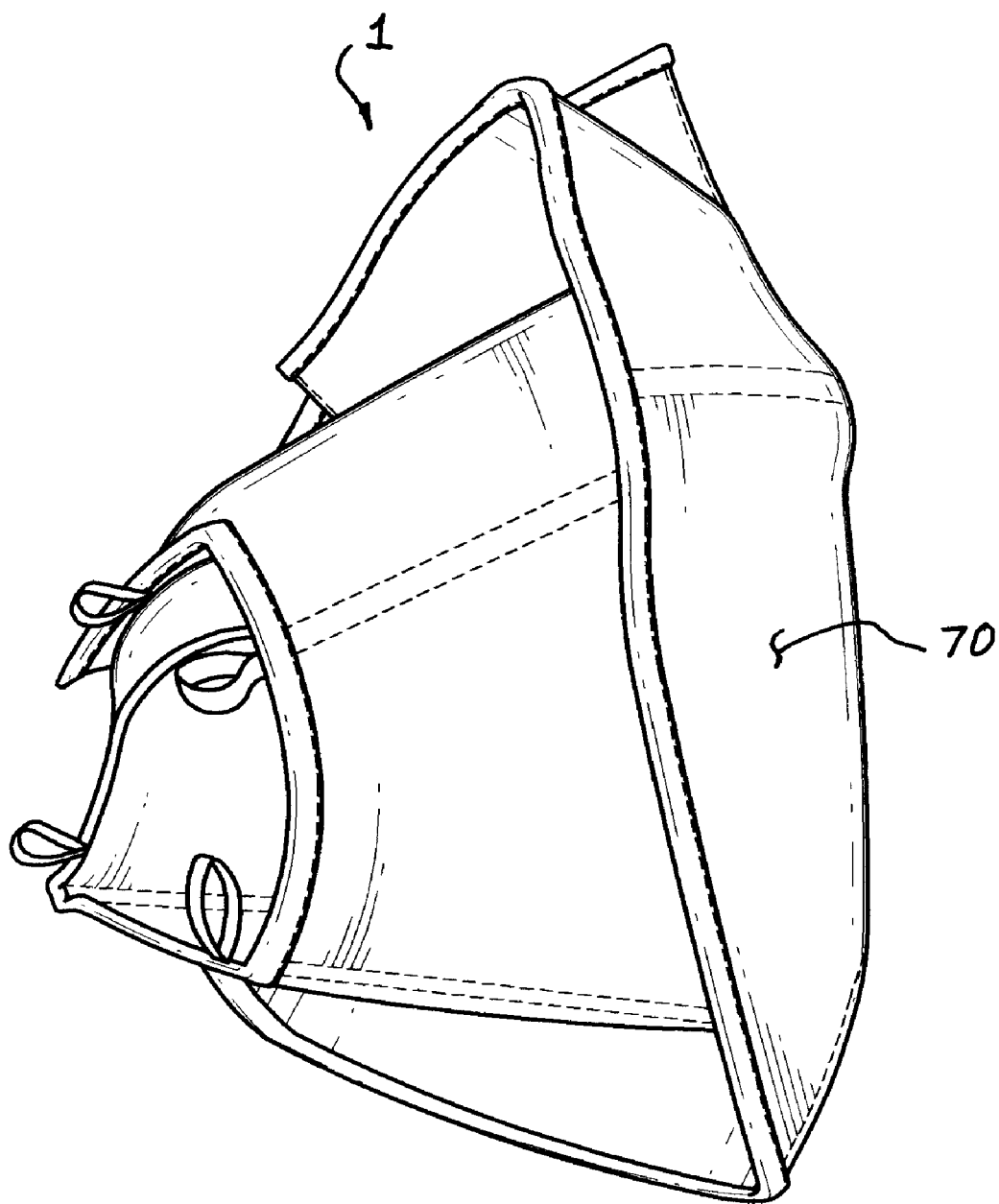
FIG. 12 shows the protective collar such as in FIG. 1 with its outer edge folded back exteriorly.

Referring to FIG. 12, with the construction as described above, providing a bendable and resilient construction, sufficient to be self supporting, the protective collar can be folded outwardly along its outer margin to provide a cuff 70. This will allow more freedom of movement for the pet's head giving the protective collar more variety of configurations for a wide range of pet sizes.

Notably, these constructions for a protective collar do not have to slip over the head of the pet, but rather can close around the neck.

The exterior sheet or sheets such as sheets 10 and 20 in FIG. 1 can be made as spaces for advertising or personal messages by owners. Also the collar strip strung into the loops 54 can carry advertising or other types of messages. Such messages can relate to beneficial or charitable content or they can be commercial. The collar strip can be reserved with an area in which the owner can implement her own message The invention further provides a method of using a pet protective collar as described above as a veterinary restraint. The method comprises placing a collar such as that described herein around the neck of an animal, and securing as described. Conveniently, the collar of the invention is suitable to protect an area from contact by the animal's mouth, and yet is comfortable enough to wear that the animal will tolerate the collar.

Figure 6:
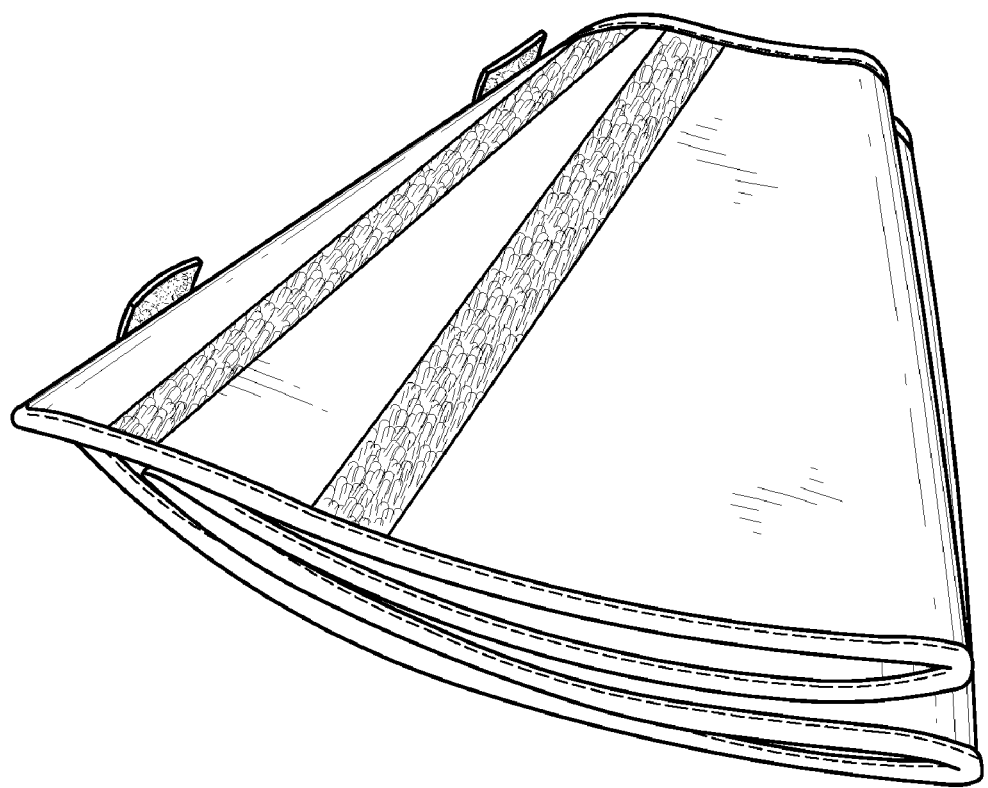
FIG. 6 is a folded view of the protective collar of FIG. 1.
Figure 7:
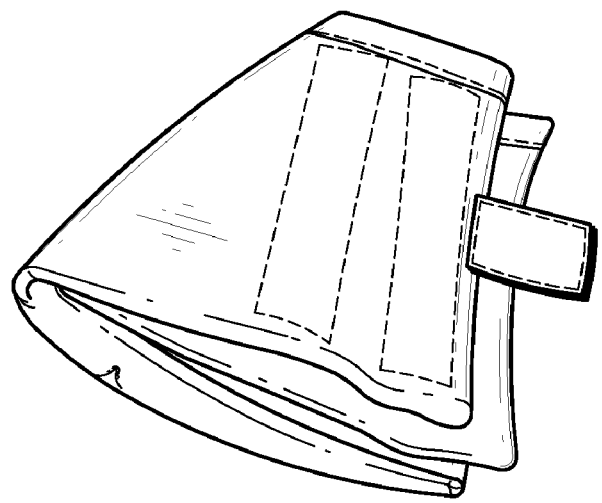
FIG. 7 is a folded view of the protective collar of FIG. 3.
Figure 8:
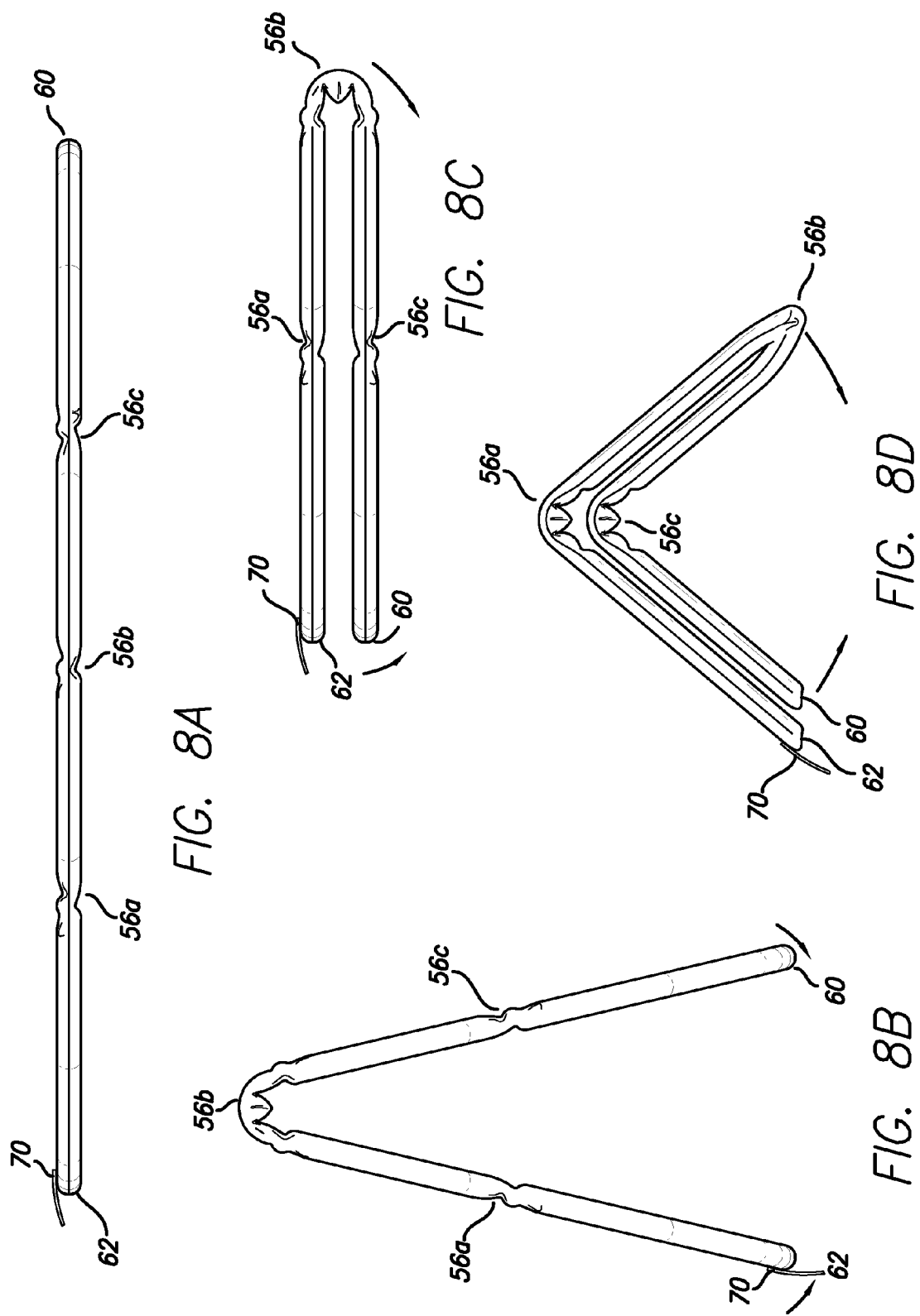
FIGS. 8A-8D show folding steps for folding a protective collar into the form as shown in FIG. 7.
Figure 9:
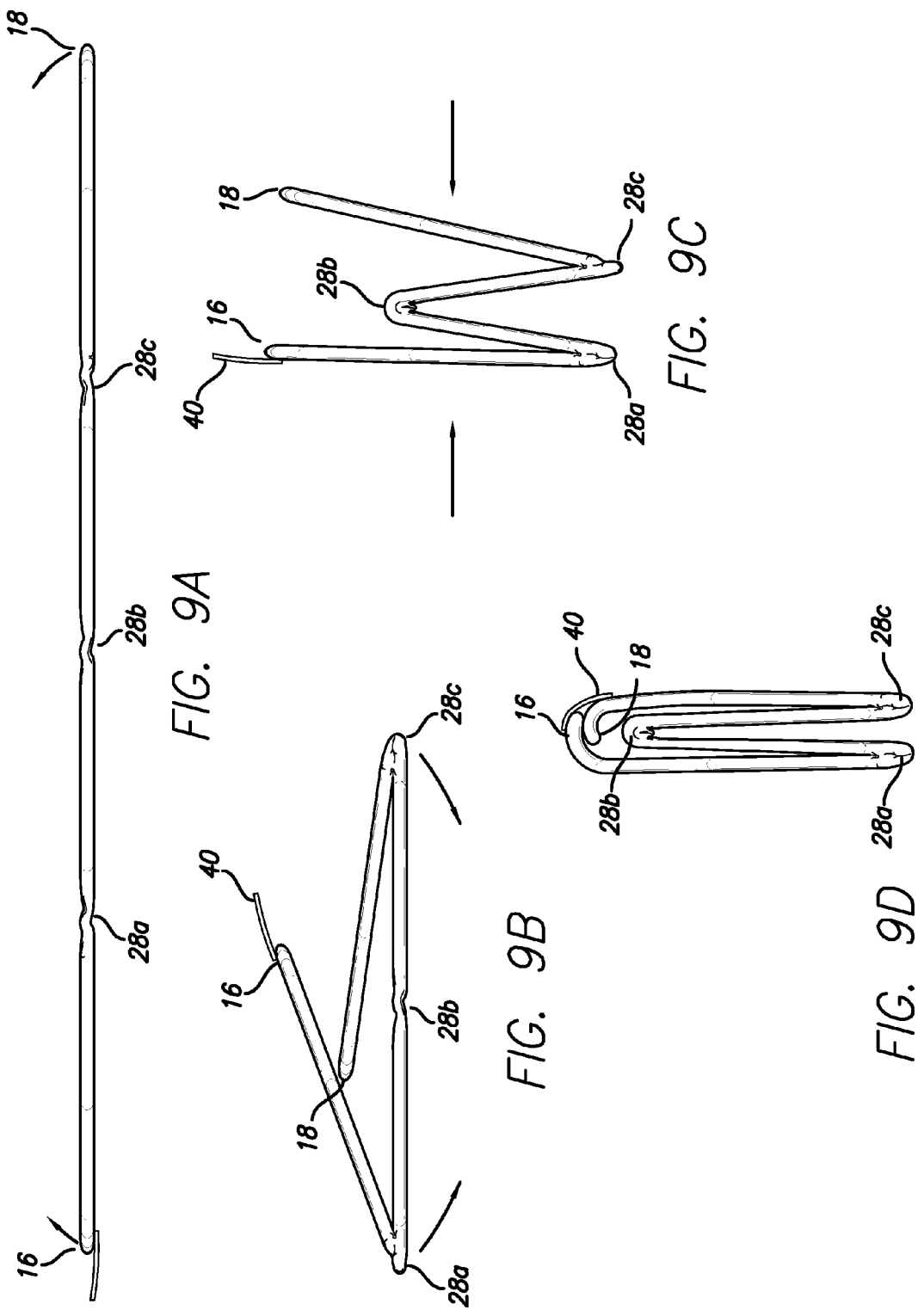
FIGS. 9A-9D show another set of folding steps for folding a protective collar into the form as shown in FIG. 6.

An additional feature of the invention lies in the ability to fold it into a small package for selling purposes or for the consumer to store it. One folding configuration is shown in FIGS. 7, 8A through 8D. This configuration is most suitable for smaller sizes with very easily flexed soft material such as the version described as illustrated in FIGS. 4 and 5. In this fold configuration the ends 60 and 62 meet and the fold points at 56a and 56b are together, the soft material being able to allow the fold points 56a and 56b to settle together. Another fold configuration is shown in FIGS. 6 and 9A through 9B. This configuration is most suitable for larger sizes with less easily flexed material such as the version described and illustrated in FIGS. 1 and 2. In this fold configuration ends 16 and 18 meet and are held together by the tabs 40 and 38 fastening to a mating strip 34 while the fold points 28a and 28b are separate and the fold point 28b is captured between close to the ends 16 and 18.

The collar is thus suitable for use in a method of protecting a wound from a surgical procedure, an injury that is non-surgical in nature, or to prevent mouth contact of an area to which a topical medicament has been applied.

When applied, it is known that some animals will use their teeth to try to dislodge the collar. This is where adhering the inside layer to the padding is particularly useful because it prevents the animal from finding or creating a fold by biting.

The foregoing detailed description of exemplary and preferred embodiments is presented for purposes of illustration and disclosure in accordance with the requirements of the law. It is not intended to be exhaustive nor to limit the invention to the precise form or forms described, but only to enable others skilled in the art to understand how the invention may be suited for a particular use or implementation. The possibility of modifications and variations will be apparent to practitioners skilled in the art. No limitation is intended by the description of exemplary embodiments which may have included tolerances, feature dimensions, specific operating conditions, engineering specifications, or the like, and which may vary between implementations or with changes to the state of the art, and no limitation should be implied therefrom. This disclosure has been made with respect to the current state of the art, but also contemplates advancements and that adaptations in the future may take into consideration of those advancements, namely in accordance with the then current state of the art. It is intended that the scope of the invention be defined by the Claims as written and equivalents as applicable. Reference to a claim element in the singular is not intended to mean "one and only one" unless explicitly so stated. Moreover, no element, component, nor method or process step in this disclosure is intended to be dedicated to the public regardless of whether the element, component, or step is explicitly recited in the Claims. No claim element herein is to be construed under the provisions of 35 U.S.C. Sec. 112, sixth paragraph, unless the element is expressly recited using the phrase "means for . . . " and no method or process step herein is to be construed under those provisions unless the step, or steps, are expressly recited using the phrase "comprising step(s) for . . . "

What is claimed is:

1. A protective collar effective as a veterinary restraint when fitted on an animal, the protective collar comprising:
    a layered assembly comprising;
        a first sheet comprising a flexible substantially non-resilient material having inner and outer arcuate edges extending between a first end and a second end of the first sheet, the inner and outer arcuate edges comprising single circular arcs, wherein the outer arcuate edge has a substantially greater radius than the inner edge;
        a second sheet comprising a flexible substantially non-resilient material and having a substantially similar shape to that of the first sheet;
        a flexible resilient padding layer, forming a generally similar shape to the first and second sheets located between said first and second sheets, such that when assembled the first and second sheets and the padding layer form the layered assembly having an outer arcuate edge and an inner arcuate edge and a first end and a second end;
    the first sheet and the second sheet and the padding layer between them being formed into the assembly by securing together the outer arcuate edges and the inner arcuate edges and the first and second ends of the first and second sheets;
    a closure, effective to secure the first and second ends of the protective collar, such that when the first and second ends of the protective collar are secured, a closed configuration is formed having an inner opening and an outer opening, the inner opening being substantially smaller than the outer opening, wherein the outer opening is configured to encompass the wearer's head and the inner opening is configured to encompass a wearer's neck but not the head;
    wherein the protective collar is sized and shaped to encompass both the wearer's head and neck on different parts of the restraint.

2. The protective collar of claim 1 further comprising a plurality of radial stitching lines at least partially extending between the inner arcuate edge and the outer arcuate edge of the layered assembly, operative to effectively segment the collar into panels, and such that the stitches are further effective as fold lines in order to easily fold the collar for packaging or storage.

3. The protective collar of claim 2, wherein the stitching lines comprise a first radial stitching line approximately centrally of the layered assembly between the first and second ends and second and third radial stitching spaces approximately angularly equally from the first radial stitching line.

4. The protective collar of claim 1 wherein upon securing the closure the collar forms a truncated cone, wherein the outer opening is of sufficient size to prevent the animal fitted with the protective collar from contacting an area of the body intended to be protected and the outer opening is sized to encompass a cranium of the animal.

5. The protective collar of claim 1, wherein the means of securing the first and second sheets to the resilient padding layer comprises laminating or otherwise adhering the resilient padding layer to at least one of the first and second sheets.

6. The protective collar of claim 1, wherein the means of securing the first and second sheets to the resilient padding layer comprises the use of stitching.

7. The protective collar of claim 1, wherein the means of closure comprises the use of hook and loop strips located respectively proximate the first and second ends of the collar.

8. The protective collar of claim 1, further providing a means for identifying the animal upon which the collar is fitted.

9. A protective collar effective as a veterinary restraint when fitted on an animal, the protective collar comprising:
a layered assembly comprising;
a first sheet comprising a flexible substantially non-resilient material having inner and outer arcuate edges extending between a first and second end of the first sheet, the inner and outer arcuate edges comprising circular arcs, wherein the outer arcuate edge has a substantially greater radius than the inner edge;
a second sheet comprising a flexible substantially non-resilient material and having a substantially similar shape to that of the first sheet;
a flexible resilient padding layer. in the form of a sheet of a generally similar shape to the first and second sheets located between said first and second sheets, such that when assembled the first and second sheets and the padding layer form the layered assembly having an outer arcuate edge and an inner arcuate edge and a first end and a second end;
the first sheet and the second sheet and the padding layer between them being formed into the assembly by securing together the outer arcuate edges and the inner arcuate edges and the first and second ends of the first and second sheets;
a closure, effective to secure the first and second ends of the protective collar, such that when the first and second ends of the protective collar are secured a closed configuration is formed having an inner opening and an outer opening, the inner opening being smaller than the outer opening to provide a truncated cone shape.

10. The protective collar of claim 9, wherein the second radial stitching line is angularly spaced toward the first end, the third radial stitching line is angularly spaced toward the second end, the angular distance from the second radial stitching line to the first end and the angular distance from the third radial stitching line to the second end being each less than the angular distance between the second and third radial stitching lines, whereby upon folding at the second and third angular stitching lines the first end and the second end respectively will be in a position angularly short of the angular distance between the second and the third radial stitching lines.

11. The protective collar of claim 1, wherein the circular arcs comprise semi-circular arcs and the sheets are flat when the collar is completely opened.

12. The protective collar of claim 9, wherein the circular arcs comprise semi-circular arcs and the sheets are flat when the collar is completely opened.

13. A protective E-collar, comprising:
a layered assembly comprising;
a first sheet comprising a flexible substantially non-resilient material having inner and outer arcuate edges extending between a first end and a second end of the first sheet;
a second sheet comprising a flexible substantially non-resilient material and having a substantially similar shape to that of the first sheet;
a flexible resilient padding layer, forming a generally similar shape to the first and second sheets located between said first and second sheets, such that when assembled the first and second sheets and the padding layer form the layered assembly having an outer arcuate edge and an inner arcuate edge and a first end and a second end;
the first sheet and the second sheet and the padding layer between them being formed into the assembly by securing together the outer arcuate edges and the inner arcuate edges and the first and second ends of the first and second sheets;
a closure, effective to secure the first and second ends of the protective collar, such that when the first and second ends of the protective collar are secured, a closed configuration is formed having an inner opening and an outer opening, the inner opening being substantially smaller than the outer opening;
wherein only the inner opening of the two openings is adapted to fit securely around the neck of the wearer.

* * * * *